March 4, 1924. 1,485,457
D. F. GEIGER
POWER TRANSMITTER AND OPERATING MECHANISM THEREFOR
Filed May 13, 1921 2 Sheets-Sheet 1
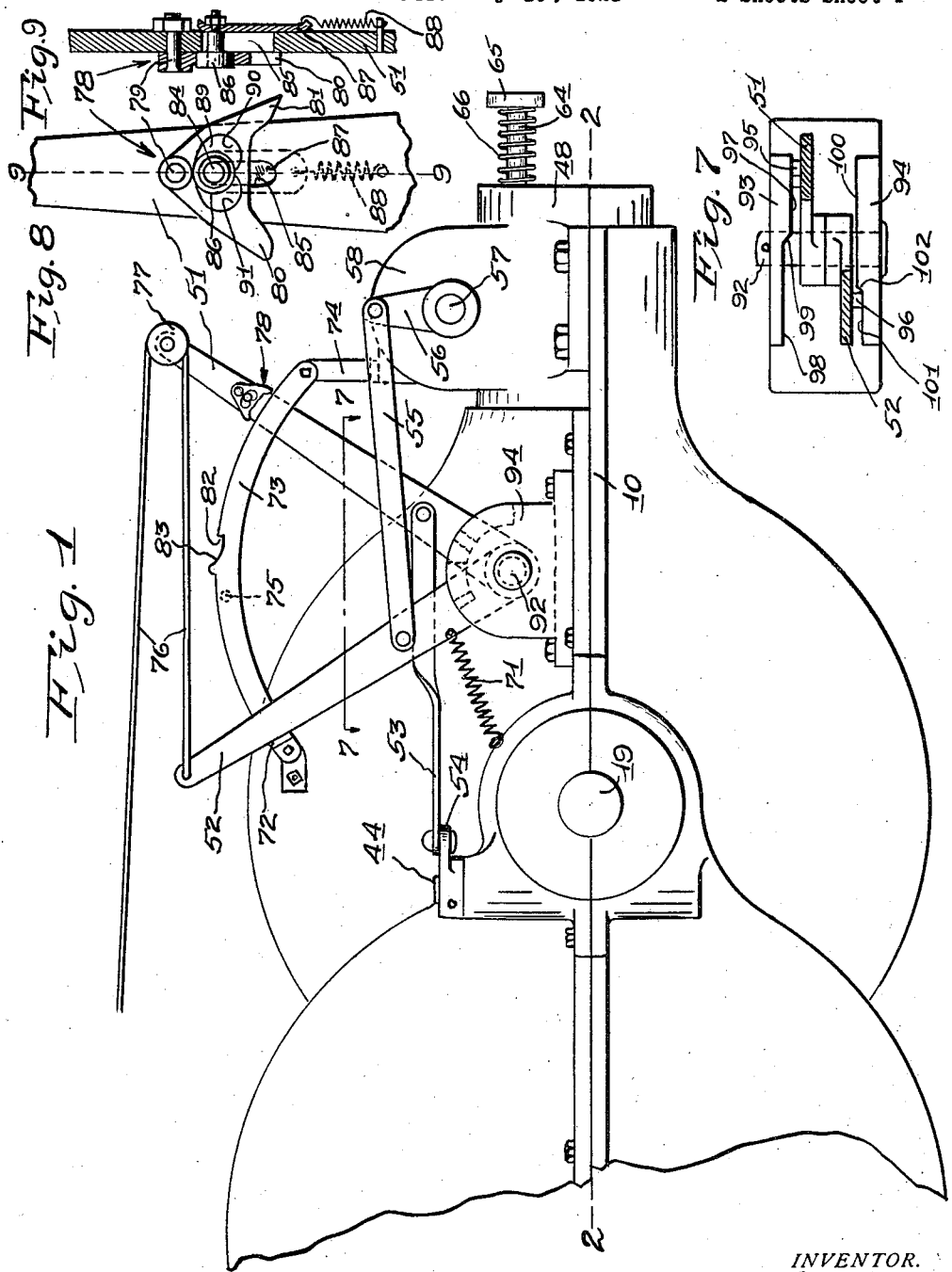
INVENTOR.
David F. Geiger
BY
Bradbury + Caswell
ATTORNEYS

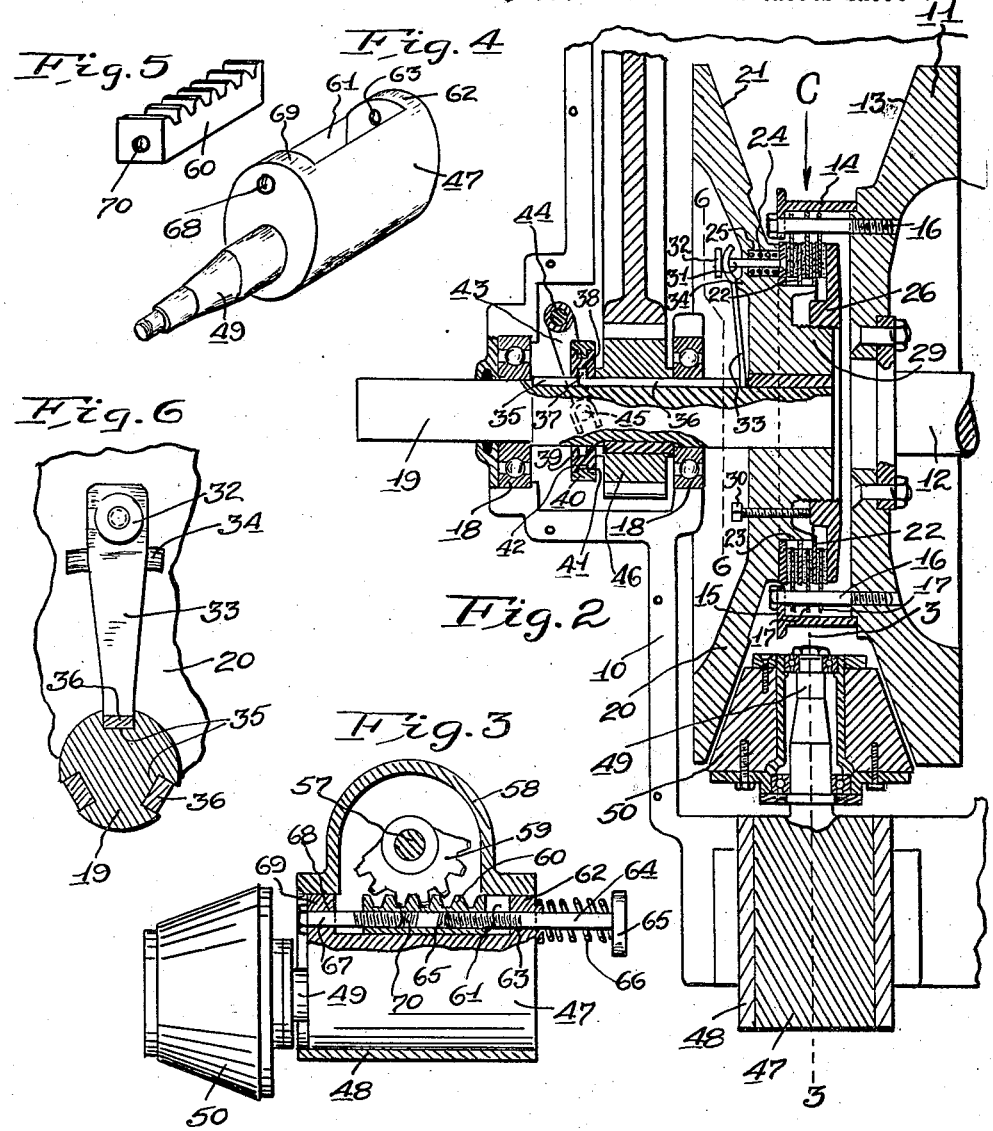

Patented Mar. 4, 1924.

1,485,457

UNITED STATES PATENT OFFICE.

DAVID FRANKLIN GEIGER, OF MINNEAPOLIS, MINNESOTA.

POWER TRANSMITTER AND OPERATING MECHANISM THEREFOR.

Application filed May 13, 1921. Serial No. 469,148.

*To all whom it may concern:*

Be it known that I, DAVID FRANKLIN GEIGER, a citizen of the United States, residing in Minneapolis, in the county of Hennepin and State of Minnesota, have invented a new and useful Power Transmitter and Operating Mechanism Therefor, of which the following is a specification.

My invention relates to improvements in power transmitters and operating mechanism therefor.

It pertains to devices of that type of power transmitters pointed out in applications for patent filed by myself on October 26, 1916, and November 20, 1916, and numbered 127,814 and 132,262, respectively. In devices of the character disclosed in said applications, a power unit is supplied with separate power transmitters associated with independent traction wheels of a vehicle, each transmitter having a line controlled operating lever adapted to assume three positions, one for connecting the power unit with its respective traction wheel to drive the same in one direction, another for connecting said parts to reverse the rotation of the traction wheel and the third for disconnecting said power unit and traction wheel.

The object of my present invention is to provide improvements in such power transmitters and operating mechanism therefor to simplify the structure, render it more efficient and durable in use and better adapt the same to production in large quantities.

With the foregoing and other objects in view, which will appear in the following description, the invention resides in the novel combination and arrangement of parts and in the details of construction hereinafter described and claimed.

In the drawings, Fig. 1 is a side elevation of a device embodying my invention; Fig. 2 is a sectional view thereof taken on the line 2—2 of Fig. 1; Fig. 3 is a sectional view in detail taken on the line 3—3 of Fig. 2; Fig. 4 is a perspective view, illustrating in detail the sliding journal shown in Fig. 3; Fig. 5 is a perspective view in detail of the adjustable, compensating rack within said journal; Fig. 6 is a sectional view in detail taken on the line 6—6 of Fig. 2; Fig. 7 is a sectional view in detail taken on the line 7—7 of Fig. 1; Fig. 8 is an enlarged view in elevation, illustrating the locking dog on one of the actuating levers, and Fig. 9 is a sectional view taken on the line 9—9 of Fig. 8.

Referring to the drawings, I have used the reference numeral 10 to indicate a frame adapted to support a power unit, supplied at either or both ends with a driving wheel 11 upon a power shaft 12 thereof. My improved power transmitter is usually duplicated, one transmitter being associated with one fly wheel of a power unit and the other with another fly wheel of said unit. Such arrangement is employed principally in tractors having independently propelled traction wheels, the lines controlling said transmitters being operated as in driving a team to start, stop, turn and reverse the tractor. It will be understood, however, that I do not limit my improved power transmitter and operating mechanism to such duplicate use. I form the outer face of the fly wheel 11 with a beveled face 13 and also supply said wheel with a driving clutch member of a clutch C of ordinary design, the multiple disc type being illustrated herein. This driving clutch member preferably includes an annulus 14 formed at its outer margin with an inwardly extending flange 15, through which stay bolts 16 are fitted, the same being threaded at their ends in the fly wheel 11. Rings 17, slidable axially with respect to the fly wheel, are carried within the annulus 14 upon said stay bolts 16. On the frame 10, in suitable bearings 18, I journal a stub shaft 19 to turn in axial alignment with the fly wheel 11. Upon the end of this stub shaft, next adjacent said wheel 11, is a driven wheel 20 having a face 21 beveled oppositely with respect to the face 13 of said wheel 11. Driven clutch rings 22, interposed between said driving rings 17 and feathered (not shown) on an annular shoulder 23 of said wheel 20, are normally pressed against said driving rings 17 by the action of spaced, coiled springs 24, fitted within recesses 25 in the inner face of said driven wheel 20. An adjustable stop plate 26, to limit the throw of said springs 24, is fitted on a threaded hub 29 of said wheel 20, the same being secured in adjusted relation by means of a set-screw 30 fitted in said wheel 20. Bolts 31, passing axially through the springs 24 and secured to the outer driven clutch ring 22, are formed with heads 32 at their outer ends, beneath which the curved ends of radial levers 33 are placed. Said levers 33 bear upon fulcrums 34 on the wheel 20 near their curved ends, the inner ends of said levers being inserted in longitudinal slots 35 in the stub shaft 19. Slides 36 in said slots abut at their inner ends against the inner ends of said radial levers 33, the outer ends of said slides being formed with out-turned shoulders 37 engaging in recesses 38 in an annular block 39, slidable on the shaft 19. Encircling this block is a collar 40, having an internal bead 41 resting in an annular groove 42 in the periphery of said block. Arms 43, one of which is seen in Fig. 2, are fixed to an upright shaft 44 in the frame 10. These arms have pivotal, slidable connections at their free ends with radial studs 45 on opposite sides of said collar. Said shaft 44 is turned, as will hereinafter appear, to move the slides 36 back and forth upon the stub shaft 19, whereby the springs 24 are permitted to engage the clutch rings 17 and 22 or are compressed to prevent the engagement of said rings. When said clutch rings are in engagement, the motion of the fly wheel 11 is transmitted directly to the driven wheel 20. Disengagement of said rings 17 and 22 frees said driven wheel 20 from the fly wheel 11. A driving gear 46, or other power take-off element, is fixed to the stub shaft 19. At right angles to the shaft 12 of the motor unit and stub shaft 19 of my transmitter, I arrange a sliding journal 47, the same being mounted in a bearing 48 on the frame 10. A stub shaft 49, offset from the axis of said journal 47, projects inwardly between the beveled faces 13 and 21 of the wheels 11 and 20 and revolubly carries a beveled friction or reversing wheel 50. A rearward thrust of said journal 47 causes the friction wheel 50 to seat between the beveled surfaces 13 and 21, said journal being free to turn slightly in one direction or the other, thus compensating for inequalities in structural arrangement and equalizing the pressure of said friction wheel 50 against the beveled faces 13 and 21 on the driving and driven wheels 11 and 20. The engagement of the friction wheel 50 with said beveled faces is accomplished when the members of the clutch C are disengaged, as will hereinafter appear. During such engagement, the motion of the driving wheel 11 is transmitted to the driven wheel 20 in reverse direction, thus turning the stub shaft 19 and associated parts reversely with respect to the direction in which said parts are turned when the wheel 20 is connected directly through the clutch C with the driving wheel 11.

I provide novel mechanism for actuating the reversing wheel 50 and clutch C, the same embodying two levers 51 and 52 pivoted upon the frame 10, as seen in Fig. 1. The lever 51 is connected through a link 53 with an arm 54 on the upright shaft 44, while the lever 52 is connected through a link 55 with an arm 56 on a shaft 57 journaled transversely in a housing 58 above the sliding journal 47. Said shaft 57 is fitted with a gear quadrant 59, arranged to mesh freely with a rack 60 within a groove 61 in said journal. The wall 62 at the front of said groove 61 (Fig. 4) is formed with an aperture 63 to slidably receive a bolt 64, the threaded end of which is fitted in a threaded bore 65 in the forward end of the rack 60. A coiled compression spring 66, encircling said bolt 64 and interposed between the forward end of the journal 47 and head 65 of the bolt 64, yields to permit rearward movement of the rack 60 with respect to the journal 47 when a predetermined pressure between the reversing wheel 50 and beveled faces 13 and 21 of the wheels 11 and 20 has been effected by a pull upon the lever 52. The tension of said spring 66 may be altered as desired by the adjustment of the bolt 64 in said rack. An adjustable stop bolt 67, slidable in an aperture 68 in the wall 69 at the rear of the groove 61 in the journal 47, is threaded at its inner end in a threaded bore 70 in the rack 60, the head of said bolt being designed to abut against the rear side of said wall 69 to limit the forward movement of the rack 60 with respect to the journal 47. A coiled spring 71, stretched between the lever 52 and a point on the frame 10 at the rear thereof, yieldingly holds said lever in retracted position against a stop 72 on a quadrant 73 spanning the throw of the upper ends of said levers 51 and 52. This quadrant is supported on suitable braces 74 from the frame of the structure and carries a second stop 75 to limit the retraction of the lever 51, which is yieldingly thrust into forward position (Fig. 1) by the action of the clutch springs 24 through connecting parts. A line or rein 76, secured to the lever 52, is passed forwardly over a sheave 77 on the lever 51, thence rearwardly to the operator. The relative resistance of the clutch springs 24 and spring 71 against the movement of the levers 51 and 52, respectively, is such that a pull upon the line 76 results, first in shifting the lever 51 to clutch disengaging position against the stop pin 75 and, secondly, in the forward throw of the lever 52 to position engaging the friction reversing wheel 50 with the wheels 11 and 20. Subsequent slackening of the line is followed by the return of the lever 52 to retracted position, then the return throw of the lever 51 forward to clutch engaging position. Thus, it will be seen that when the line 76 is slackened, the clutch members of the clutch C will be engaged to directly connect the driven wheel 20 with the fly wheel 11. It will also be understood that a sufficient pull upon the line 76 to throw the lever 51 rearwardly to position against the stop pin 75 will cause the members of the clutch to be disengaged and, further, that a continued pull upon said line will cause the reversing friction wheel 50 to function. The lever 51 is supplied with a dog 78 to releasably secure said lever at the end of its rearward throw and thereby allow the operator to slacken or drop his line 76 and at the same time retain the parts of the transmitter in neutral relation. Said dog is triangular in shape, the upper extremity being pivoted on a pin 79 in the lever 51, the rear, lower extremity thereof forming a trip lug 80 and the forward lower extremity providing a latch member 81. A catch 82 in the quadrant 73 is adapted to be engaged by said latch member 81 and a raised cam surface 83 adjacent to said catch is designed to co-act with the trip lug 80 and latch 81 for reasons soon to appear. A pin 84, slidable in a slot 85 in the lever 51, carries a roller 86 at one end and is attached at its other end to a link 87 yieldingly urged downward by a tension spring 88 on said lever. The roller 86 lies within an inverted heart-shaped aperture 89 formed in the dog 78. Tilted positions of said dog are yieldingly maintained by the roller 86 in the bays 90 and 91 of said aperture 89. The catch 82 and cam surface 83 are located near the stop pin 75. When the lever 51 closely approaches this pin, the trip lug 80 rides upon the cam surface 83 and throws the latch 81 downward behind the catch 82, the dog 78 being thus yieldingly held by the roller 86, which drops into the bay 90 of the aperture 89. In this position of the dog 78, the lever 51 is locked against forward movement. To release the latch 81 from the catch 82, the lever 51 is pulled slightly to the rear to engage the former with the cam surface 83 and cause the same to be lifted from catch engaging position by tilting the dog 78 to position wherein the roller 86 registers with the bay 91 in said dog. This shifting movement of the dog 78 removes the obstruction and permits the lever 51 to swing again into forward position.

While I can depend upon the relative tensions in the springs 24 and 71 to control the movements of the levers 51 and 52, additional means may be provided to positively insure the proper relation between said levers. Above the shaft 92 upon which the levers 51 and 52 are slidably pivoted (Fig. 7) and upon opposite sides of said levers, I have arranged two quadrants 93 and 94, the former resting adjacent to the lever 51 and the latter adjacent to the lever 52. These quadrants have opposed contact surfaces thereon, which are slidably engaged by lugs 95 and 96 on said levers. The contact surface on the quadrant 93 has a high portion 97 and a low portion 98 joined by a short beveled step 99. The contact surface on the quadrant 94 also has a high portion 100 and a low portion 101 joined by a short beveled step 102. The levers 51 and 52 bear, one against the other, at their pivoted ends, the contact surfaces on said quadrants being so arranged that the lever 52 is held by the engagement of its lug 96 with the step 102 against swinging forward from initial position until the lug 95 on the lever 51 is free to seek the low portion 98 on the contact surface of its quadrant 93. Likewise, the lever 51 is held against return forward movement until the lever 52 has reached its normal position (Fig. 1) wherein the lug 96 thereon is free to seek the low portion 101 of its quadrant 94.

In use, these conditions are readily effected by the line 76. The driven member 20 of the transmitter is freed from the power unit by a pull upon said line to shift the lever 51 to the end of its rearward throw, said lever being releasably secured in such position by the dog 78, as above explained; said driven member 20 is connected directly through the clutch C with the power unit by slackening the line 76 and thereby permitting the lever 51 to assume forward position; and said driven member 20 is propelled in reverse direction with respect to the power unit by a pull upon said line to shift the lever 51 rearwardly and the lever 52 forwardly. Thus it will be seen that said conditions may be selectively obtained by the mere operation of the flexible line, held in the hand of an operator at any of various operating positions.

Attention is directed to the particular organization of parts, whereby, during reversing movement, the stub shaft 19 is operated upon by substantially counterbalancing thrusts, thus promoting longevity of the bearings and other associated parts. Referring to Fig. 2, it will be noted that when the members of the clutch C are disengaged, the thrust on the shaft 19, caused by the arms 43, is in a direction to the right. In this relation of the clutch members, the reversing friction wheel 50 is thrown into engagement with the beveled faces 13 and 21 of the driving and driven wheels 11 and 20, whereupon a thrust is instituted against the shaft 19 in a direction to the left. These counter thrusts practically balance one another, thus relieving the parts associated with said shaft 19 from strains which would otherwise be imposed upon them.

Changes in the specific form of my invention, as herein disclosed, may be made within the scope of what is claimed without departing from the spirit of my invention.

Having described my invention, what I claim as new and desire to secure by Letters Patent is:

1. In a device of the class described, a driving member, a driven member, a clutch and a reversing member for said driving and driven members, independent levers for operating said clutch and reversing member, said levers being tiltable on a common axis and slidable longitudinally thereon, means for limiting the sliding movements of said levers, said means being further adapted to arrest the movement of one lever during a predetermined movement of the other, and means for actuating said levers.

2. In a device of the class described, a driving member, a driven member, a clutch and a reversing member for said driving and driven members, independent levers for operating said clutch and reversing member, means for retracting said levers in opposite directions, means for positively arresting the movement of one lever during a predetermined movement of the other, and a line attached to one lever and having a sliding bight in connection with the other for actuating said levers.

3. In a device of the class described, a driving member, a driven member, a clutch and a reversing member for said driving and driven members, a lever to operate the clutch, a lever to operate the reversing member, and a single line for actuating said levers.

4. In a device of the class described, a driving member, a driven member, a clutch and a reversing member for said driving and driven members, independent levers for operating said clutch and reversing member, said levers being normally inclined in different directions, a single line secured to one lever and having a sliding bight in connection with the other lever, said line serving to actuate both of said levers.

5. In a device of the class described, a driving member, a driven member, a clutch for directly connecting and disconnecting said members, a lever for actuating said clutch, a member for reversibly connecting the driving and driven members, a lever for actuating said reversing member, a single line to operate said levers, yielding retracting devices of unequal strength for the levers, the device associated with one lever being adapted to secure it against movement by said line until the other lever has been actuated thereby and conversely to provide for the retracting action of said lever prior to the similar action of said other lever, said line serving to operate said levers whereby the driven member is unaffected or propelled in one direction or the other, either condition being selectively obtained at will.

6. In a device of the class described, a driving wheel having a beveled face thereon, a driven wheel formed with a beveled face opposed to that of said driving wheel, a clutch for directly connecting and disconnecting said driving and driven wheels, clutch actuating mechanism carried by said driven wheel, and a beveled reversing wheel movable into and out of engagement with said beveled faces, the thrust upon the driven wheel occasioned by the engagement of the reversing wheel therewith being countered by the reverse thrust on said wheel occasioned by the action of said clutch mechanism.

7. In a device of the class described, a driving member, a driven member, a clutch and a reversing member for said driving and driven members, independent levers for operating said clutch and reversing member, a line attached to one lever and having a sliding operable connection with the other lever and independent retracting devices of unequal strength operating upon said levers in opposite directions.

8. In a device of the class described, a driving member, a driven member, a clutch and a reversing member for said driving and driven members, a clutch lever and a reversing lever for operating said clutch and reversing members, respectively, a retracting device for the clutch lever, a retracting device for the reversing lever, said latter retracting device being of greater strength than the other and designed to operate in a direction opposed to that of said first mentioned retracting device, a stop for the clutch lever, an automatically releasable latch on said clutch lever arranged to hold said lever in proximity to said stop and a line attached to the reverse lever and having a slidable operable connection with the clutch lever.

9. In a device of the class described, a driving member, a driven member, a clutch and a reversing member for said driving and driven members, a clutch lever and a reversing lever for operating said clutch and reversing member respectively, retracting devices for said levers arranged to shift the same in reverse directions, a stop for the clutch lever, an automatically releasable latch on said clutch lever arranged to hold said lever in proximity to said stop and a line attached to the reverse lever and having a slidable operable connection with the clutch lever.

10. In a device of the class described, a power unit, a driving wheel associated therewith and having a beveled face, a driven wheel in axial alignment with said driving wheel and formed with a beveled face opposed to that of said driving wheel, a clutch for directly connecting and disconnecting said driving and driven wheels, a sliding journal arranged at right angles with respect to the axes of said driving and driven wheels, a beveled reversing wheel revolubly carried by said journal and arranged to turn on an axis parallel with that of said journal but offset therefrom, and means for yieldingly sliding said journal in a direction to engage the reversing wheel with the beveled faces of said driving and driven wheels.

11. In a device of the class described, a power unit, a driving wheel associated therewith and having a beveled face, a driven wheel in axial alignment with said driving wheel and formed with a beveled face opposed to that of said driving wheel, a clutch for directly connecting and disconnecting said driving and driven wheels, a sliding journal arranged at right angles with respect to the axes of said driving and driven wheels, a beveled reversing wheel revolubly carried by said journal and arranged to turn on an axis parallel with that of said journal but offset therefrom, operating means for sliding said journal back and forth, said means including mechanism for yieldingly engaging the reversing wheel with the beveled faces of said driving and driven wheels, operating means for shifting the clutch members and a single controlling line for actuating said operating means whereby the members of the clutch and the reverse member are alternately shifted into operative relation.

12. In a device of the class described, a driving member, a driven member, a clutch and a reversing member for said driving and driven members, a lever to operate the clutch, a lever to operate the reversing member, flexible actuating means for said levers and means for holding one lever against movement during a predetermined movement of the other lever.

In testimony whereof, I have signed my name to this specification.

DAVID FRANKLIN GEIGER.